US007382208B2

(12) United States Patent
Stockwald (10) Patent No.: US 7,382,208 B2
(45) Date of Patent: Jun. 3, 2008

(54) OPERATING METHOD FOR THE RESONANT OPERATION OF HIGH-PRESSURE LAMPS IN LONGITUDINAL MODE, AND AN ASSOCIATED SYSTEM AND ELECTRONIC BALLAST

(75) Inventor: Klaus Stockwald, Germering (DE)

(73) Assignee: Patent-Treuhand-Gesellschaft für Elektrische Glühlampen MbH, Munich (DE)

( * ) Notice: Subject to any disclaimer, the term of this patent is extended or adjusted under 35 U.S.C. 154(b) by 437 days.

(21) Appl. No.: 11/041,267

(22) Filed: Jan. 25, 2005

(65) Prior Publication Data
US 2005/0179401 A1 Aug. 18, 2005

(30) Foreign Application Priority Data
Jan. 30, 2004 (DE) .................. 10 2004 004 828

(51) Int. Cl.
*H03C 1/00* (2006.01)
(52) U.S. Cl. .................. 332/155; 332/157; 332/153; 332/158; 332/161; 340/870.18; 340/870.19; 340/870.2

(58) Field of Classification Search ........... 315/224, 315/225, 209 R; 332/155, 157, 153, 158–162; 340/870.18, 870.19, 870.2; 455/313
See application file for complete search history.

(56) References Cited

U.S. PATENT DOCUMENTS

| 5,889,490 A * | 3/1999 | Wachter et al. ............ 342/127 |
| 6,184,633 B1 | 2/2001 | Kramer |
| 6,400,100 B1 * | 6/2002 | Kramer ..................... 315/291 |
| 6,489,731 B1 | 12/2002 | Bruning et al. |
| 2003/0117085 A1 | 6/2003 | Kramer |
| 2003/0117086 A1 | 6/2003 | Kramer |

OTHER PUBLICATIONS

European Search Report dated Apr. 4, 2006 from corresponding EP Application No. 04030343.0, 3 pages.

* cited by examiner

*Primary Examiner*—Tuyet Vo
(74) *Attorney, Agent, or Firm*—Carlo Bessone (57) ABSTRACT

The operating method is based on the simultaneous application of FM and AM. In this process, the fundamental frequency of the AM is derived from at least one, preferably the second, longitudinal mode. In continuous operation of the lamp, the color temperature is set for a prescribed power by setting the AM degree controllably.

13 Claims, 6 Drawing Sheets

OPERATING METHOD FOR THE RESONANT OPERATION OF HIGH-PRESSURE LAMPS IN LONGITUDINAL MODE, AND AN ASSOCIATED SYSTEM AND ELECTRONIC BALLAST

TECHNICAL FIELD

This application is closely related to DE-Az 10 2004 004 829.0, which has been submitted in parallel and to which reference is hereby expressly made.

The invention proceeds from an operating method for the resonant operation of high pressure lamps in longitudinal mode, and an associated system and electronic ballast (EB). Especially, it deals with an operating method for the resonant operation of high-pressure lamps in longitudinal mode, using a high-frequency carrier frequency that is frequency-modulated (FM), in particular by means of sweep signal, and which is simultaneously amplitude-modulated (AM), firstly a fundamental frequency of a AM being defined and the fundamental frequency of the AM being derived from the $i^{th}$, preferably the second, longitudinal mode. What is involved here, in particular, is high pressure discharge lamps with a ceramic discharge vessel, preferably with an aspect ratio of at least 1.5.

BACKGROUND ART

U.S. Pat. No. 6,400,100 has already disclosed an operating method for the resonant operation of high pressure lamps in longitudinal mode, and an associated system and EB. Specified there is a method for finding the second longitudinal acoustic resonant frequency. It assumes that during the continuous sweeping of the frequency exciting the longitudinal mode the resonant frequency in the vertical operating position can be found by an occurrence of a relative increase in the operating voltage of the lamp. It emerges that the longitudinal frequency for a segregated arc state is found in vertical resonance with the aid of this method, and then maintained. However, depending on the composition of the metal halide filling and the timing of the expiry of the search procedure, this frequency thus found can be established far too high, and so an excitation of the acoustic resonance at the frequency found with the aid of the abovementioned method produces inadequate mixing and does not eliminate the segregation satisfactorily. Moreover, it is expensive to implement in an electronic ballast.

Otherwise, in previously known metal halide lamps the color temperature is fixed for an operating point exclusively by the lamp geometry, shape of the internal volume of the discharge vessel, electrode spacing and filling (buffer gas+ selection of the metal halides 25) for a narrow power range $P_n \pm 3\%$. Possible in this case as type of operation for color-locus control is power variation or, given square-wave or a.c. operation also a control of the duty cycle, use being made of cataphoresis processes.

DISCLOSURE OF THE INVENTION

It is an object of the present invention to provide an operating method in accordance with the preamble of claim 1 which renders color control possible for metal halide lamps, in particular for vertical operation. A further object is not to change the power level in the process.

This object is achieved by means of the characterizing features of claim 1. Particularly advantageous refinements are to be found in the dependent claims.

The operating method according to the invention is aimed at exciting one or more, preferably the second longitudinal resonance, and at controlling the amplitude modulation in this case, in particular clocking it, by means of pulse width modulation. This creates possibilities for the color control of metal halide lamps by means of clocked and/or structured amplitude modulation, for example in the form of pulse width variation, if appropriate in combination with pulse height variation, in conjunction with a constant lamp power level.

Given a constant AM, the energy input associated therewith cannot be metered. By contrast, a clocked AM permits a finely tuned energy input without different operating positions of the lamp leading to other operating conditions.

It is assumed that a narrow tolerance range obtains for the inner length given a prescribed geometry of the discharge vessel. It constitutes that dimension of the lamp which defines the longitudinal acoustic resonances that must be excited for optimal mixing of the arc plasma, in particular in a vertical operating position.

In a vertical operating position, the demixing results in greatly changed speeds of sound by comparison with a horizontal operating position, which have the effect that after the warm-up phase of the lamp the acoustic longitudinal resonance (for example f002_vert) is clearly shifted with reference to the horizontal operating position (such as f002_hor)—mostly toward higher frequencies. Over the course of time, this resonant frequency then changes during a customary operating mode with an unchanging color temperature, which brings about gradual mixing, until said frequency once again corresponds to that in the case of horizontal operation f002_hor.

Because of the segregation set up chiefly during vertical operation, deviations are to be seen in the speed of sound of up to 30%, mostly of about 10 to 25% towards higher values by comparison with the mixed state in a horizontal operating position. For example, deviations of approximately 15 to 20% in the speed of sound for Hg/Ar buffer gas mixtures are found by comparison with mixed operation. A concrete measured value was situated at 550 m/s by comparison with 464 m/s. The resonant frequency of the second longitudinal resonance is generally given by f002=c1×L, in which case $$C1 = (R^* \kappa^* T/M)^{1/2}$$

is the speed of sound, with R: general gas constant, κ≈compressibility, T: mean plasma temperature, M: mean molar mass of the plasma gas; L=axial length of the discharge vessel.

The invention proceeds from an operation with the carrier frequency in the medium HF range from 45 to 75 kHz, typically 50 kHz, on which a sweep frequency is preferably impressed as FM modulation whose value is selected from a range from 100 to 200 Hz. Impressed on this operation is an amplitude modulation which is characterized by at least one of the two parameters of AM degree and time period of the AM, that is to say a mark-to-space ratio and time-controlled AM depth AM(t). If appropriate, setting the AM or manipulating it can be started only after a warm-up phase. The AM degree is defined as AM-degree=(Amax−Amin)/(Amax−Amin). Here, A is the amplitude.

In addition to the method, the invention includes a ballast in which the procedures described are implemented.

In detail, an aspect ratio (inner length/inside diameter) of the discharge vessel of at least 1.5, in particular L/D=2.5-5.5, is preferred in the case of high efficiency HCL lamps with great inner length. In this case, the intensity of one or more longitudinal modes (preferably the first, second or third) is excited with the aid of medium to high frequency AM operation by means of the amplitude modulation degree. In these modes, the filling is transported into the central region of the discharge vessel with the result that the filling distribution in the discharge vessel is set along the arc. This is especially important, in particular, for vertically or obliquely (>55° angle of inclination) operated lamps. The result of this is a change in the composition of the vapor pressure, and also in the spectral absorption of the deposited filling constituents. The modulation frequency (fundamental frequency of the AM) for exciting the longitudinal modes is typically in the frequency range of 20-35 kHz. For this purpose, FM (frequency modulation) is carried out with sweep modes in the range of approximately 100-200 Hz for a carrier frequency of typically 45-75 kHz.

Both the AM degree alone and the time period of the modulated AM frequency can be used for control purposes as pulse times and rest times. The color temperature can change over large ranges in conjunction with a high light efficiency and constant lamp power by means of these parameters of AM degree and mark-to-space ratio, that is to say the ratio between the time T during which the AM is switched on and the time in which the AM is switched off, abbreviated as T(AM-on)/T(AM-off), as well as, moreover, a time-controlled variable amplitude modulation depth AM(t), that is to say a superstructure of the AM degree.

In particular, in the vertical operating position it is possible to control to and fro between a completely segregated plasma state and complete suppression of the segregation. It has emerged that these two states correspond to different color temperatures such that both these extreme values and values of the color temperature lying therebetween can be set by means of the ratio T(AM-on)/T(AM-off). For example, it is possible in this way to regulate changes in color temperature above 1000 K, for example from 3000 K up to 4500 K or even yet more pronounced changes in color temperature.

Typical metal halide fillings contain $DyI_3$, $CeI_3$, $CaI_2$, CsJ, LiI and NaI. The AM degree is typically between 15%-40% in continuous operation. However, it can reach values between 0 and 50% if a rapid sequence of AM time ranges with a different AM is used.

Instead of the alternation of a specific AM phase with a phase without AM, it is also possible within the meaning of the invention to use an alternation between two different AM phases.

BRIEF DESCRIPTION OF THE DRAWINGS

The aim below is to explain the invention in more detail with the aid of several exemplary embodiments. In the drawing.

BEST MODE FOR CARRYING OUT THE INVENTION

Figure 1:
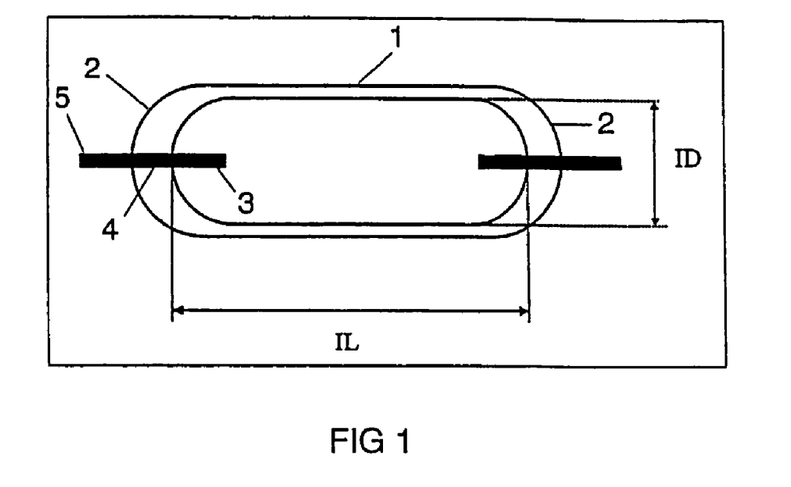
FIG. 1 shows a schematic of the discharge vessel of a high pressure lamp.

FIG. 1 shows a schematic of a high pressure lamp with a relatively high aspect ratio ID/IL. It uses a cylindrical discharge vessel 1 made from ceramic with a given inside diameter ID and given inner length IL. Arranged at the ends 2 of the discharge vessel are electrodes 3 that are connected to supply leads 5 by means of lead-throughs. The discharge vessel typically contains a filling of buffer gas Hg with argon and metal halides, for example a mixture of alkali metal iodides and rare earth metal iodides as well as thallium iodide. The lamp is operated with high frequency in acoustically stabilized resonance on an electronic ballast, see FIG. 8. In particular, the second longitudial resonance has proved to be worthy of recommendation for this purpose.

The lamp investigated in more detail is a high efficiency metal halide lamp with a power of 70 W. The discharge vessel has a large axial inner length IL of 18.7 mm and an inside diameter ID of 4 mm. The aspect ratio is therefore 4.7. The high pressure lamp is filled with 4.4 mg Hg and a metal halide mixture consisting of NaI: $CeI_3$:$CaI_2$:TlI=1.78 : 0.28 : 1.93 : 0.28 mg. The electrode spacing is 14.8 mm.

It was established by preliminary investigations that arc-stabilized operation is possible in which the arc is centered on the electrode connecting line in vertical and horizontal operating positions. The starting point for this purpose is taken as operation with a swept high frequency in the range of 45-55 kHz with a typical sweep rate of fFM=130 Hz.

In the vertical operating position, a segregated, that is to say demixed metal halide distribution is seen along the arc after the start of operation and a warm-up phase of approximately 120 sec. The proportion of the metal halides to be found in the vapor phase is not distributed uniformly over the arc length. The emission of the alkali metal iodides and rare earth iodides is concentrated in the lower third of the lamp, while an emission chiefly of Hg and T1 is observed in the upper part as far as the upper electrode. In this state, the lamp has a relatively low color rendition and a relatively low light yield. In addition, the color temperature in the vertical operation position differs substantially from that with a horizontal operating position, specifically by up to 1500 K.

Figure 2:
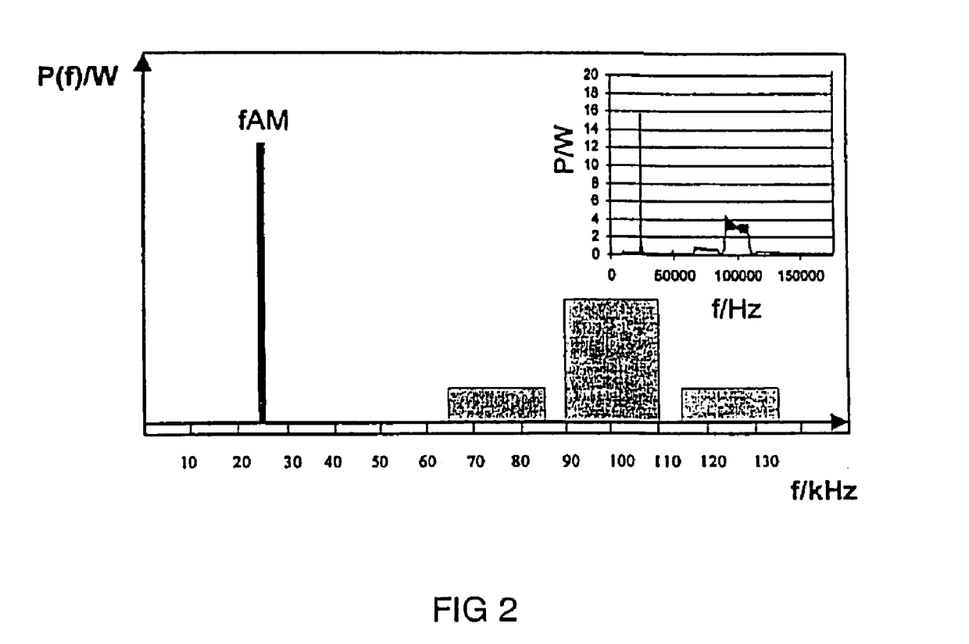
FIG. 2 shows a schematic power spectrum of a high pressure lamp, modulated with AM and FM, for stabilizing by means of acoustically excited longitudinal resonances.

In accordance with the schematic illustration of FIG. 2 (in which the small image shows the real measurement), an electric power spectrum is produced in the lamp for a sweep rate of 130 s-1, that is to say over the time interval of 7.7 ms, in the range of 20 to 150 kHz by impressing an amplitude modulation with a constant frequency fAM of approximately 25 kHz and an AM degree of 10-30%. Higher orders are not considered further here because of the possibility of their suppression. The power fraction in the range of the AM frequency (25 kHz) acts to excite the second acoustic longitudinal resonance f002.

Figure 3:
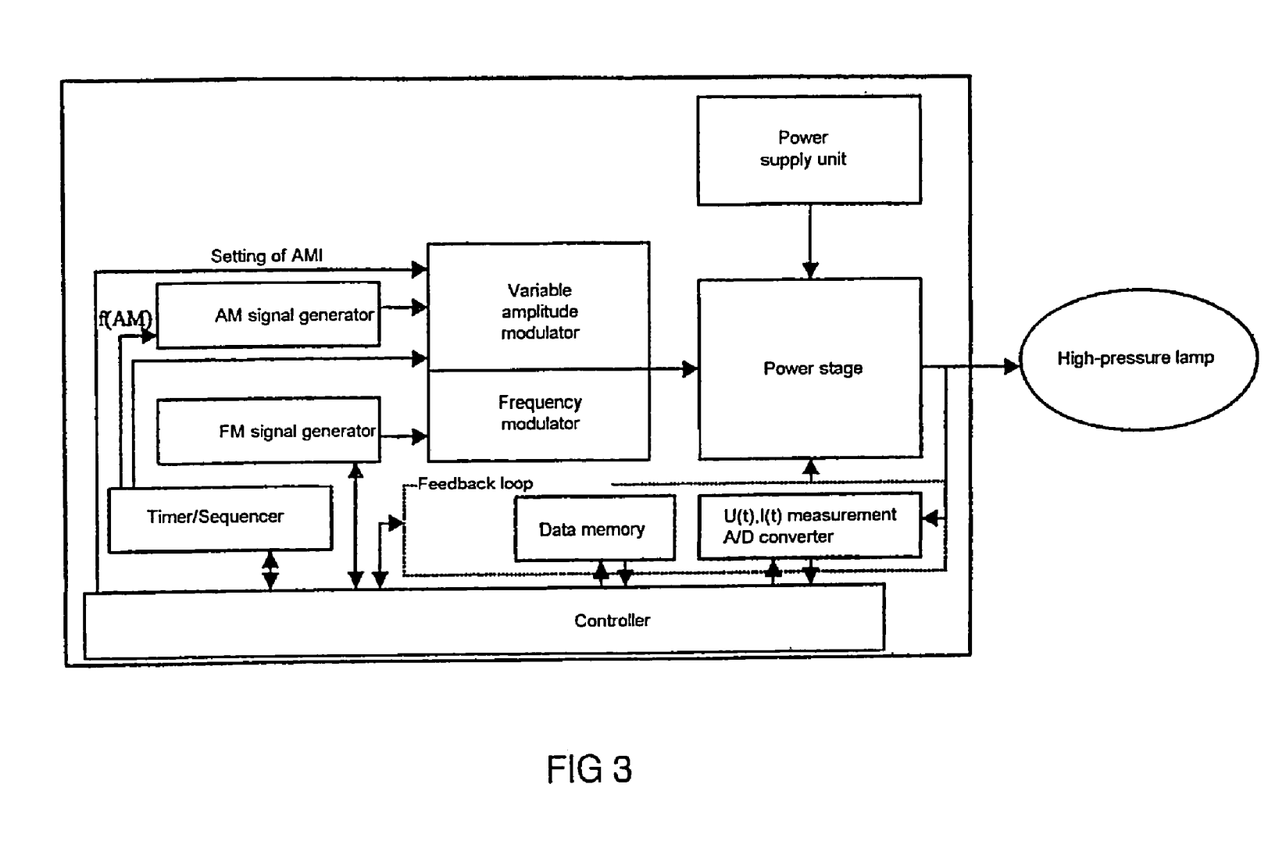
FIG. 3 shows the schematic structure of an electronic ballast.

FIG. 3 shows a block diagram of an associated electronic ballast (EB). It has the following essential components:

Timer/Sequencer: Here, the timing pattern is monitored to control the time period of the warm-up phase and inception of the impressing phase after the ignition of the high-pressure lamp and its arc transfer. Moreover, the sweep rate for stabilizing the lamp arc is controlled here.

Furthermore, the scanning rate and dwell time at the respective frequency point during traversal of frequency scans are controlled times, as is the fixing of rest as frequency scans are run through between consecutive steps in the procedure.

Power up stage: Full or half bridge with current-limiting elements and typical frequency response. It is coupled to the power supply unit via a supply rail (450 V DC).

Feedback Loop: Lamp mode detection, if appropriate feedback of lamp parameters such as lamp current and lamp voltage in order to set the control parameters and fix the warm-up or impressing phase, or to repeat impressing phases with other tuning parameters.

Here, a circuit section is implemented for sufficiently accurate measurement of current and voltage at the EB output (lamp). The measured values for processing in the controller are further processed thereby using an A/D converter. Data are written into a data memory for further evaluation procedures.

Lamp: High-pressure discharge lamp (HID lamp)

FM modulation: High-power frequency modulator

AM modulator: Analog high-power modulator with the possibility of modulating both the frequency fAM and the AM degree AMI AM signal generator: Digital or voltage-controlled oscillator FM signal generator: Digital or voltage-controlled oscillator Power supply: Rail voltage generator Controller: Central control of all units.

A number of exemplary embodiments of the novel operating method are explained below.

Figure 4:
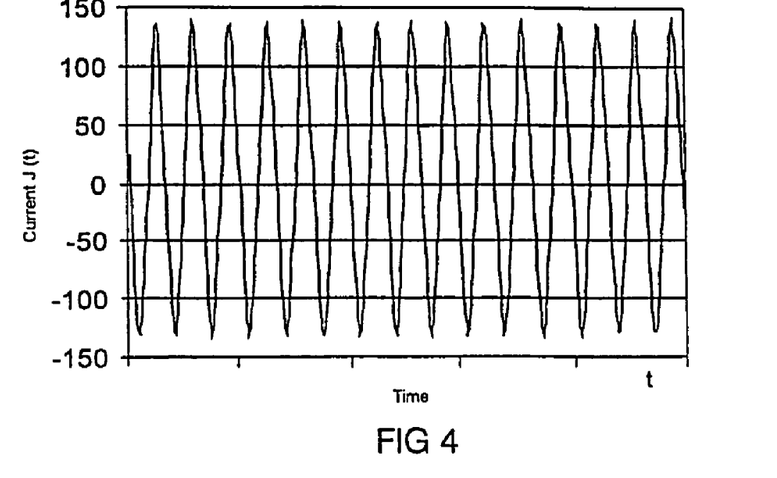
FIGS. 4-10 show various time profiles of the AM index on the carrier signal.

The simplest case is operation with the pure carrier frequency. During operation of the lamp, this frequency is frequency-modulated (FM) and typically swept in a sawtooth-like fashion for the purpose. This means and AM degree=0, and leads in vertical operation to deliberately set segregation, that is to say the demixing of the plasma. An example is given in FIG. 4, where the current is given as a function of time. This means continuous operation, that is to say $T(AM\text{-off})=\infty$, using the terminology introduced above.

Figure 5:
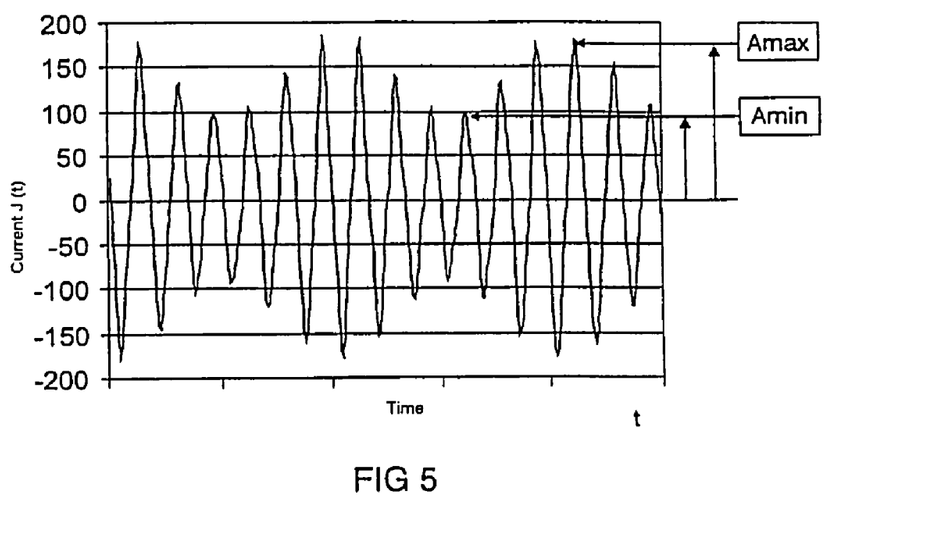

An example of AM continuous operation, that is to say $T(AM\text{-on})=\infty$ is given in FIG. 5. The maximum and minimum amplitudes Amax and Amin are depicted there. This AM is carried out over the entire operating period.

Figure 6:
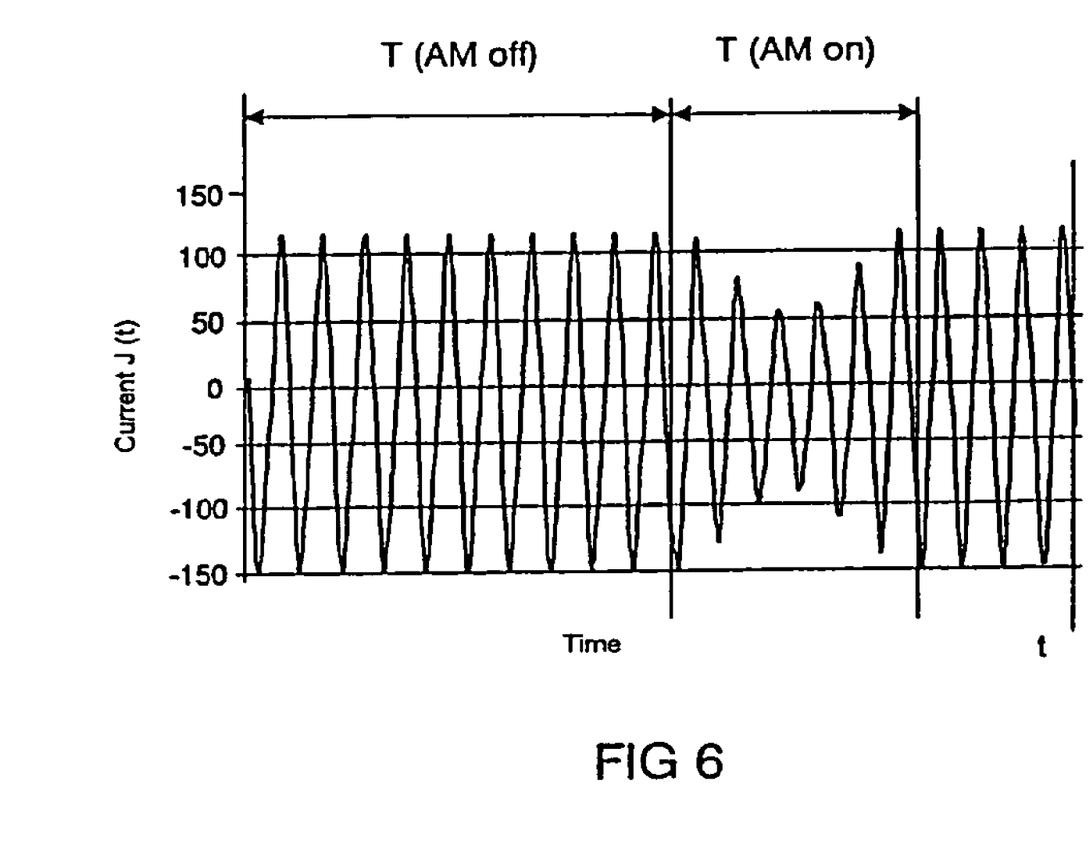

However, according to the invention use is made of a mixture of two states, or of a suitable modification. In the simplest case, sections with AM-on and periods with AM-off alternate with one another here regularly or as required. T(AM-on) is the period of feeding AM-on. T(AM-off) is the period of feeding AM-off. The two phases alternate with one another. It has emerged in particular that a relatively low ratio T(AM-on)/T(AM-off), which would correspond to continuous AM operation with an "equivalent" AM degree of approximately 15-35%, leads to cancellation of segregation in vertical operation. FIG. 6 shows the juxtaposition of periods with AM-off and AM-on schematically.

The ratio T(AM-on)/T(AM-off), that is to say the mark-to-space ratio, is preferably between 0 and T(f(AM)) and Tsweep.

However, instead of this a further structure can be impressed on a given AM, either a substructure, for example for the purpose of damping, or a superstructure, for example in the form of a ramp, trapeze or sine wave. An equivalent AM degree can also be defined here. This can be performed with, or preferably without dead times AM-off. The clocked AM illustrated above is in this sense also a superstructure with a square-wave form.

Given a suitable selection of the "equivalent" AM degree, in a prescribed acoustically settled state of the gas discharge column or plasma acoustic power is coupled into the excited state either in a clocked fashion and/or under the control of the level of acoustic resonance (or under the control of the acoustic intensity). As a result, filling transport processes in the lamp are controlled in such a way that specific color temperatures of the metal halide lamp are associated with specific superstructures in each case.

The damping of the sound waves gives rise to typical periods both for the settling process and for the maximum rest periods T(AM-off) and for the dynamics of the amplitude modulation depth (AM-degree), which can be impressed on the exciting current signals.

The AM depth is determined by the following factors:

T1=carrier frequency period;

$\tau(AM\_damp)$=damping time in the case of a damped AM signal train;

T2=amplitude modulation frequency period;

AM-degree=amplitude modulation degree (typically 15-35%);

T(AM-on)=clock cycle of the switched-on AM;

T(AM-off)=rest period of the AM.

Possible examples are damped and undamped profiles. The term AM index is sometimes also used instead of the term AM degree.

Figure 7:
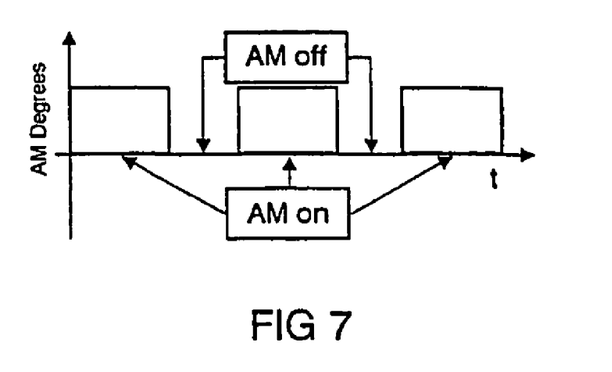

FIG. 7 is a schematic example given with a constant AM degree with fixed times Tn(AM-on) having AM-on phases and fixed times Tf(AM-off) having AM-off phase which follow one another regularly. It corresponds substantially to FIG. 6, but is illustrated in blocks.

Figure 8:
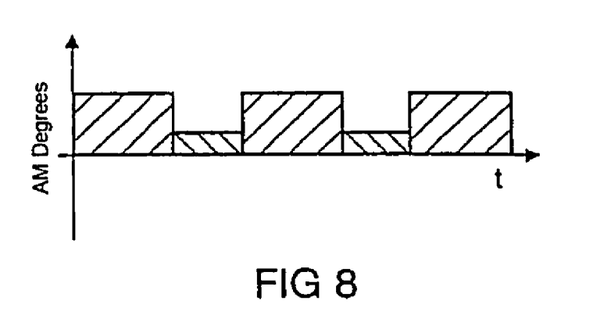

FIG. 8 shows an example with alternation of two stable AM degrees. It involves, for example, a fixed AM degree having fixed periods T1 and T2, during which maximum amplitudes with different levels Amax1 and Amax2 are used.

Figure 9:
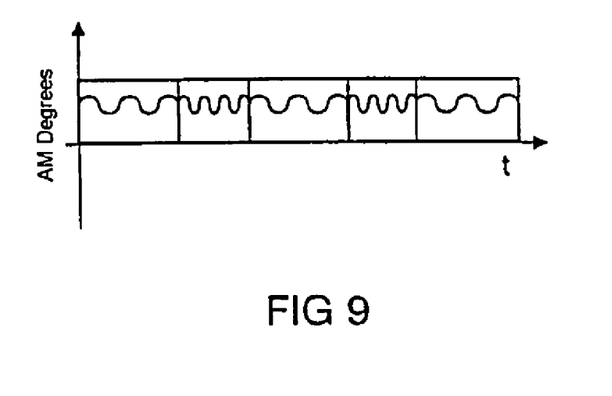

A further exemplary embodiment is in FIG. 9, specifically the alternation between two different AM degrees, for example 20 and 30%, in conjunction with an identical amplitude Amax.

Figure 10:
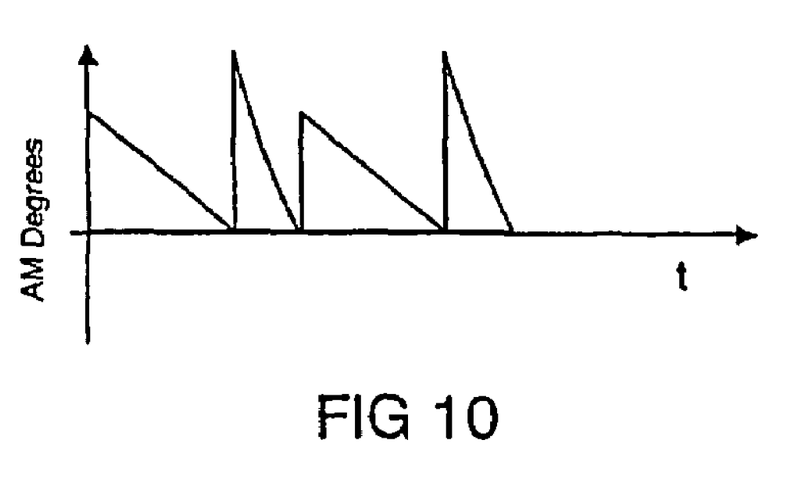

FIG. 10 shows a further example. Two mutually alternating damped dynamic AM degrees are shown there, that is to say AM degrees having a different maximum amplitude Amax, the maximum amplitude being damped in each case with a different intensity within a curve train of period T1 and T2, respectively. Of course, these different types of operation can also be suitably combined with one another.

During application of clocking, the total period Tg of a cycle $$Tg=T(AM\text{-on})+T(AM\text{-off})$$

is intended to exhibit typical periodicities in the range $Tg \leq 20$ ms, that is to say to correspond approximately to at least operation at 50 Hz.

The ratio T(AM-on)/T(AM-off) can be virtually arbitrary in this case, a minimum value of the preferred time intervals for T(AM-on) typically being 5 to 10 periods (corresponding to 0.2-0.4 ms) of the AM frequency, which is typically 20 to 40 kHz, for example 24.4 kHz. This ensures that the gas discharge column will settle into a natural resonance.

The phase of the signal AM-on is preferably coupled to the phase of the AM signal, but this requirement is not mandatory if the period of the signal AM-on, that is to say the value T(AM-on) is sufficiently high. This results in minimum duty cycles of the AM of typically 0.2/20=1/100. The ratio T(AM-on)Tg is defined as the duty cycle, Tg being defined above.

A typical damping time $\tau(AM\text{-damp})$ of the decaying sympathetic oscillation lies in accordance with FIG. 10 in the range from 20 to 50 ms for Hg-dominated plasmas, that is to say fillings that in addition to metal halides also contain mercury as a decisive ingredient.

The possibilities of clocked and, in turn, temporally modulated AM modulation yield a spectrum of control modes for setting the segregation and thus for color control, in lamps operated using this principle.

What is claimed is:

1. An operating method for the resonant operation of high-pressure lamps in longitudinal mode, using a high-frequency carrier frequency that is frequency-modulated (FM), in particular by means of sweep signal, and which is simultaneously amplitude-modulated (AM), firstly a fundamental frequency of a AM being defined and the fundamental frequency of the AM being derived from the second longitudinal mode, wherein after the ignition of the lamp and waiting out a waiting time the color temperature is set for a prescribed power by alternating the amplitude modulation periodically between at least two states.

2. The operating method as claimed in claim 1, wherein a controller sets the fundamental frequency of the AM signal.

3. The operating method as claimed in claim 1, wherein the waiting time lasts approximately 30 to 80 sec.

4. The operating method as claimed in claim 1, wherein as implementation of the AM states the amplitude of a fixed AM degree changes in steps, abruptly, gradually or differentially with a prescribed periodicity.

5. The operating method as claimed in claim 1, wherein the AM degree itself is amplitude-modulated as implementation of the AM states.

6. The operating method as claimed in claim 1, wherein the AM state is temporally structured, in particular damped, as implementation of the AM states.

7. The operating method as claimed in claim 1, wherein when the AM states are implemented an equivalent total AM degree derived from the periodic AM is in the range between 15 and 35%.

8. A system composed of a high-pressure discharge lamp and associated electronic ballast (EB), having a discharge vessel that contains metal halides, wherein the aspect ratio of the discharge vessel $\geq 1.5$, preferably 2.5, the EB being suitable for implementing an operating method as claimed in claim 1.

9. The operating method as claimed in claim 1, wherein the frequency of the sweep signal is derived from the first azimuthal and radial modes.

10. The operating method as claimed in claim 9, wherein the sweep frequency is kept constant during operation, and in that it is in the range between the first azimuthal and radial modes.

11. The operating method as claimed in claim 1, wherein two fixed AM degrees alternate with one another over time as implementation of the AM states.

12. The operating method as claimed in claim 11, wherein the implementation is performed by one fixed AM degree being clocked such that one AM degree is =0%.

13. The operating method as claimed in claim 11, wherein an equivalent total AM degree derived from the ratio between the time period T1 of a first AM degree and the time period T2 of a second AM degree is in the range between 15 and 35%.

* * * * *